(12) United States Patent
Lamoureux (10) Patent No.: US 10,052,940 B2
(45) Date of Patent: Aug. 21, 2018

(54) BASE FOR VEHICLE GLAZING UNIT, GLAZING UNIT, METHOD FOR MANUFACTURING THE GLAZING UNIT, AND USE OF THE BASE

(71) Applicant: SAINT-GOBAIN GLASS FRANCE, Courbevoie (FR)

(72) Inventor: Laurent Lamoureux, Ribecourt-Dreslincourt (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 697 days.

(21) Appl. No.: 14/404,242

(22) PCT Filed: May 30, 2013

(86) PCT No.: PCT/FR2013/051218
§ 371 (c)(1),
(2) Date: Nov. 26, 2014

(87) PCT Pub. No.: WO2013/178953
PCT Pub. Date: Dec. 5, 2013

(65) Prior Publication Data
US 2015/0147110 A1 May 28, 2015

(30) Foreign Application Priority Data
May 30, 2012 (FR) ...................... 12 54988

(51) Int. Cl.
*B60J 1/20* (2006.01)
*B60R 11/00* (2006.01)
(Continued)

(52) U.S. Cl.
CPC ............ *B60J 1/20* (2013.01); *B32B 17/10036* (2013.01); *B60J 1/00* (2013.01); *B60R 11/00* (2013.01);
(Continued)

(58) Field of Classification Search
CPC ............ B32B 37/1284; B32B 37/1292; B32B 2405/00; B60J 1/00; B60J 1/20;
(Continued)

(56) References Cited

U.S. PATENT DOCUMENTS 3,684,617 A * 8/1972 Windecker ............. C09J 163/00
156/108
5,040,838 A * 8/1991 Yoshizawa ................. B60J 1/02
296/180.1
(Continued)

FOREIGN PATENT DOCUMENTS

DE 10 2004 061 362 2/2006
DE 10 2006 039 065 3/2007
(Continued)

OTHER PUBLICATIONS

"Automobile Windshield." MadeHow. May 26, 2011, [online], [retrieved on Nov. 5, 2017]. Retrieved from the Internet <URL: https://web.archive.org/web/20110526053908/http://www.madehow.com/Volume-1/Automobile-Windshield.html>.*
(Continued)

*Primary Examiner* — Josh Skroupa
(74) *Attorney, Agent, or Firm* — Oblon, McClelland, Maier & Neustadt, L.L.P.

(57) ABSTRACT

A vehicle glazing unit including a glazed element and at least one base for reversible attachment of an accessory to the glazed element, the base including an aperture for passage of the accessory, the base including a non-flat outer face which is fastened opposite a non-flat inner face of the glazed element. The outer face includes two adhesive strips each having an elongate shape and both positioned lengthwise along the transverse horizontal axis of the glazing unit.

14 Claims, 4 Drawing Sheets

(51) Int. Cl.
*B60J 1/00* (2006.01)
*B32B 17/10* (2006.01)
*B60R 11/04* (2006.01)
*B60S 1/08* (2006.01)
*F16B 11/00* (2006.01)

(52) U.S. Cl.
CPC ....... *B60R 11/04* (2013.01); *B60R 2011/0026* (2013.01); *B60R 2011/0042* (2013.01); *B60R 2011/0063* (2013.01); *B60S 1/0881* (2013.01); *F16B 11/006* (2013.01); *Y10T 156/10* (2015.01); *Y10T 403/471* (2015.01); *Y10T 403/472* (2015.01)

(58) Field of Classification Search
CPC . B60R 11/00; B60R 11/04; B60R 2011/0026; B60R 2011/0063; B60R 2011/0042; F16B 11/006; Y10T 156/10; Y10T 403/471; Y10T 403/472; B60S 1/0881
USPC .................................. 403/266, 267; 156/60
See application file for complete search history.

(56) References Cited

U.S. PATENT DOCUMENTS

| | | |
|---|---|---|
| 2007/0039750 A1 | 2/2007 | Jantelezio |
| 2007/0158378 A1 | 7/2007 | Rafalowitz et al. |

FOREIGN PATENT DOCUMENTS

| | | |
|---|---|---|
| DE | 20 2007 011 489 | 2/2008 |
| DE | 10 2010 003 955 | 10/2011 |
| EP | 1 491 404 | 12/2004 |
| EP | 2 179 894 | 4/2010 |
| WO | 2007 022295 | 2/2007 |

OTHER PUBLICATIONS

"Auto Glass Prices and Parts." AutoGlassQuotez. Apr. 30, 2012, [online], [retrieved on Nov. 5, 2017]. Retrieved from the Internet <URL: https://web.archive.org/web/20120430234343/http://www.autoglassquotez.com/auto-glass-prices>.*

"A Brief History of the Windshield." DeDona Tint and Sound. [online], [retrieved on Nov. 5, 2017]. Retrieved from the Internet <URL: http://www.dedona.com/a-brief-history-of-the-windshield-glass/>.*

"A Clear View: History of Automotive SafetyGlass." Second Change Garage. [online], [retrieved on Nov. 5, 2017]. Retrieved from the Internet <URL: http://www.secondchancegarage.com/public/windshield-history.cfm>.*

International Search Report dated Aug. 6, 2013 in PCT/FR13/051218 Filed May 30, 2013.

* cited by examiner

BASE FOR VEHICLE GLAZING UNIT, GLAZING UNIT, METHOD FOR MANUFACTURING THE GLAZING UNIT, AND USE OF THE BASE

CROSS-REFERENCE TO RELATED APPLICATIONS

The present application is the U.S. counterpart of WO 2013/178953, and claims priority to French application no. 1254988 filed on May 30, 2012, the entire contents of each of which are incorporated herein by reference.

The present invention relates to the fastening of an accessory or accessories to glazing units of vehicles, and more particularly to glazing units of motor vehicles.

A base is usually fastened against the inner face of a glazed element of a vehicle glazing unit, in order to enable one or more accessories to be attached mechanically to the base in the immediate proximity of this inner face.

The accessory may be, for example, a rain and/or light sensor, or a detector or a camera.

The precise positioning and fastening of the base against the inner face of the glazed element then enables the accessory to be precisely positioned and mounted against, or practically against, this inner face.

Figure 1:
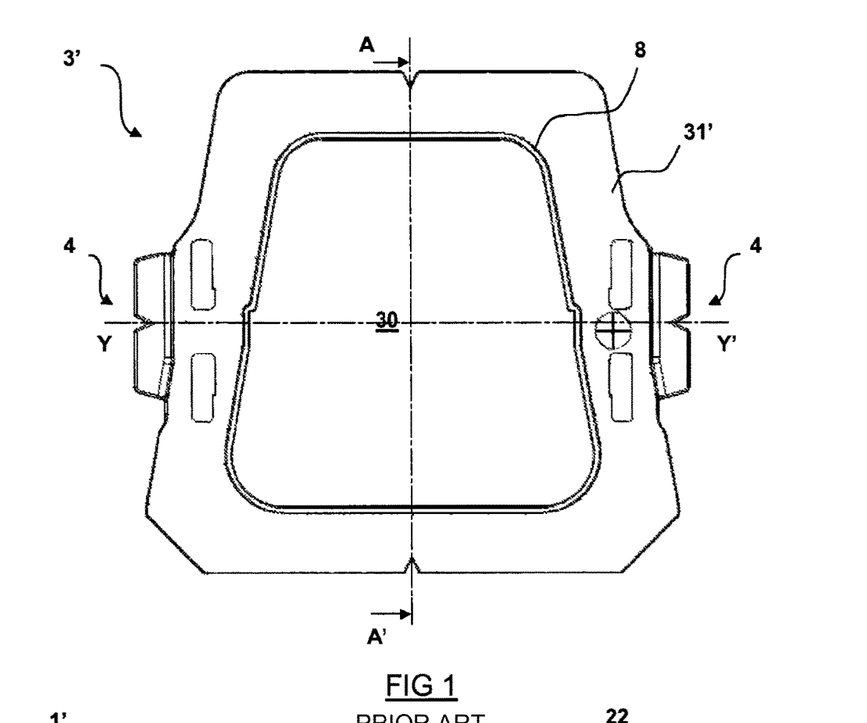
FIG. 1 is a face-on view of a base according to the prior art for attaching an accessory to a glazed element, showing the inner face (which is hatched, although it is not in cross section)
Figure 2:
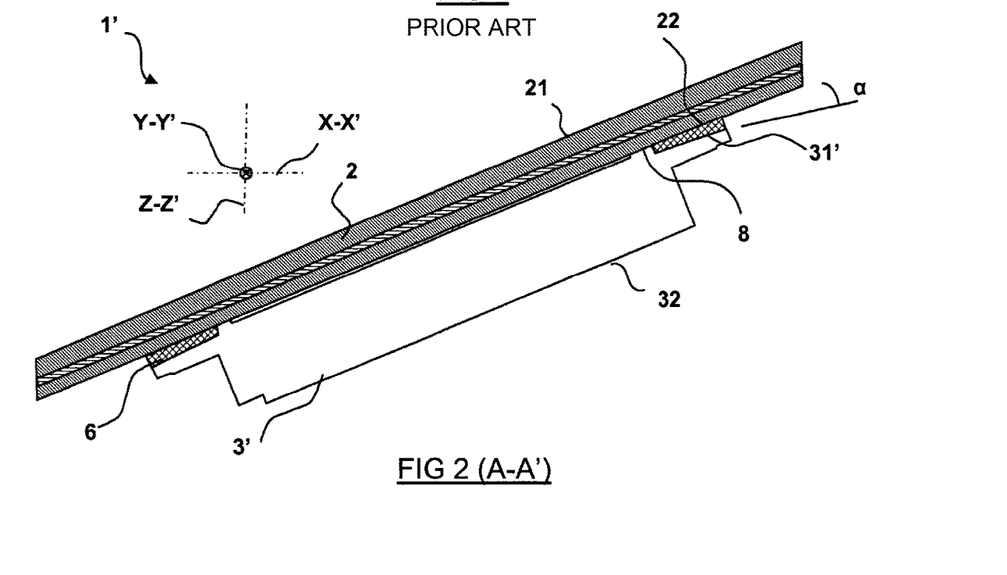
FIG. 2 is a view in partial section taken along the line AA' of FIG. 1, which also partially shows, in cross section, the glazed element and the layer of polyurethane (only the outline of the base is shown)

A base 3' according to the prior art is shown face-on in FIG. 1; a glazing unit 1' including a glazed element 2 and this base 3' for the reversible attachment (mechanical mounting) of an accessory to said glazed element 2 is shown in FIG. 2, which is a sectional view taken along AA' in FIG. 1.

The base 3' has an aperture 30 for the passage of said accessory, to enable a surface of said accessory to be placed opposite the inner face 22 of said glazed element.

The base 3' has a non-flat (or "curved") outer face 31', with a non-infinite radius of curvature in two perpendicular directions, which is fastened, by chemical fastening, opposite a non-flat (or "curved") inner face 22 of said glazed element 2, which also has a non-infinite radius of curvature in two perpendicular directions. The outer face 31' is located on the periphery of the aperture 30, and completely surrounds the aperture.

The base 3' also has an inner face 32 having means of attachment 4, enabling said accessory to be attached mechanically in a reversible manner to said base 3' after the base 3' has been fastened to the inner face 22 of the glazed element 2. These means of attachment are placed one on each side of said base, along the transverse horizontal axis Y-Y' of said glazing unit. They enable the accessory to be removed and re-used, if the vehicle glazing unit is damaged and replaced with a glazing unit having another base compatible with this accessory.

The outer face 31' of the base is distinctive: it does not contact the inner face 22 of the glazed element, because it is delimited around the whole of the aperture 30 by a peripheral ridge 8 which does contact the inner face 22 of the glazed element, and it is flared in a centrifugal manner, in other words in a direction leading away from the center of the peripheral ridge 8 toward its periphery.

In cross section, the angle α between the outer face 31' of the base and the inner face 22 of the glazed element is, for example, approximately 15°.

The base 3' is fastened by bonding to the inner face of the glazed element: a layer of polyurethane 6 is placed against the whole of the outer face 31', and then, before the polyurethane has completely polymerized, the base 3' is applied against the inner face 22 of the glazed element.

The peripheral ridge 8 normally prevents the polyurethane from entering the aperture 30; otherwise there would be a risk that the presence of the polyurethane would impede or even prevent the proper operation of the accessory.

The polyurethane often "overflows" to a small extent beyond the outer face 31' of the base, and the location of the base is therefore chosen in such a way that this overflow is not visible from either the inside or the outside of the vehicle; this location is thus generally placed under the peripheral enamel layer of the glazing unit, or similar, facing the inside of the vehicle.

The base must be positioned and bonded in a precise manner, because an aperture is also formed in the strip of enamel or similar so as to be opposite the aperture 30 of the base and thus enable the accessory to operate without interference by the strip of enamel or similar.

This bonding operation is carried out in a special workshop as a reworking operation, when the glazing unit is practically complete, before its delivery for positioning and fastening in the window opening of the bodywork which it is to fill.

The operation is lengthy, because polymerization requires a certain time and the glazing unit cannot be moved during this time, to avoid the risk of altering the position of the base. A waiting period of four days is generally allowed to elapse before the glazing unit is collected.

This operation entails major environmental and safety constraints, because the components of polyurethane are harmful to the human body.

Furthermore, in order to ensure that the thickness of adhesive is identical throughout, the base must in all cases be specific to the model of glazed element: each series of bases must be designed with an outer surface configuration specific to the inner surface configuration of the area of the glazed elements where the bases of a series of glazed elements are to be positioned.

This operation also gives rise to problems of repeatability, as the inner face of the glazed element is not always exactly identical, in the usual frame of reference X-X', Y-Y', Z-Z' of the vehicle, from one glazing unit to another in the same series. It may happen, therefore, that in the final stage, before delivery, a glazing unit becomes faulty because of the overflow of the polyurethane into the aperture of the base, leading to the costly rejection of the unit.

Additionally, the prior art includes some interior rear-view mirror bases which have an outer surface having a generally round shape, with no aperture; the rear-view mirror is attached using means of attachment provided on the inner surface of the base.

In some cases, a base of this type is fastened to the inner face of a glazed element by means of four adhesive strips, namely:
  two adhesive strips each having an elongate shape and both arranged lengthwise along the transverse horizontal axis Y-Y' of said glazing unit;
  two adhesive strips each having an elongate shape and both arranged lengthwise along the vertical axis Z-Z' of said glazing unit.

The object of the present invention is to overcome the drawbacks of the prior art by providing a special fastening method for an accessory base having an aperture, this method being simpler to apply, less constraining in terms of health and the environment, less costly, and more reliable, while having a single base configuration which can be used for glazed elements of different shapes.

Furthermore, the present invention aims to provide a method which is more easily applied and more reliable for fastening the base to the glazed element.

The present invention is thus based on a single solution, wherein two, and only two, adhesive strips are used.

Thus, according to the invention, a vehicle glazing unit has a glazed element and at least one base for the reversible attachment of an accessory to said glazed element, said base having an aperture for the passage of said accessory, such that a surface of said accessory is placed opposite the inner face of said glazed element, said base having a non-flat outer face, which is fastened opposite a non-flat inner face of said glazed element.

This glazing unit is distinctive in that said outer face has two adhesive strips, each having an elongate shape and both arranged lengthwise along the transverse horizontal axis Y-Y' of said glazing unit (which is also the transverse horizontal axis of said vehicle), preferably one on each side of the aperture for greater reliability.

The term "elongate shape" signifies here that the length of a strip along the transverse horizontal axis Y-Y' is greater than its height along the vertical axis Z-Z'.

Clearly, the fact that the number of adhesive strips is limited to two gives rise to a major drawback in that it increases the risk that the overall adhesion of the base to the glazed element will be insufficient, because, if one strip is defective, half of the adhesion is affected; however, this drawback is largely compensated for by the following advantages obtained by the specific positioning of the two adhesive strips:

since the two adhesive strips are placed lengthwise in the direction of the glazing unit in which there is the smallest variation of dimensions from one glazed element to another in the same series, this limits the risk that a base will not adhere correctly to the glazing unit as a result of an imperfection in the curvature of this glazing unit at the location specified for the positioning of the base;

an identical series of bases can be used for series of different glazed elements when these different glazed elements all have a large radius of curvature (notably equal to or greater than two meters) along the transverse horizontal axis Y-Y' at the specified location for the positioning of the base.

Furthermore, the positioning of only two adhesive strips is less costly.

The base of the glazing unit according to the invention also preferably has an inner face having means of attachment to enable said accessory to be attached mechanically in a reversible manner to said base, these means of attachment being preferably placed one on each side of said base, along the transverse horizontal axis Y-Y' of said glazing unit.

The axes X-X', Y-Y' and Z-Z' referred to in the present document are the axes normally used in the field of vehicles, where:

the axis X-X' denotes the central longitudinal horizontal axis of the vehicle, along which the vehicle advances;
the axis Y-Y' denotes the transverse horizontal axis of the vehicle, which is perpendicular to the axis X-X'; and
the axis Z-Z' denotes the vertical axis of the vehicle, which is perpendicular to the preceding two axes.

In the context of the present invention, the term "non-flat face" signifies that the face essentially has two radii of curvature, namely a first, non-infinite (in other words, finite) radius of curvature in a first direction, for example the lateral direction Y-Y', and a second non-infinite radius of curvature in a second direction, for example the height Z-Z', which is perpendicular to the first.

In the context of the present invention, the term "mounting" or "attachment" signifies mechanical mountings which are attached and detached manually or by means of a mechanical tool.

In the context of the present invention, the term "fastening" signifies chemical fastenings which give rise to molecular changes which are irreversible unless the bond is broken and the base rendered unusable.

In a variant, said outer face of the base follows the same curvature as said inner face of the glazed element at the location where the base is fastened to the glazed element: thus the radii of curvature are identical in this area.

Accordingly, the outer face of the base is easy to design, as it is simply necessary to obtain the dimensions from the inner face of the glazed element in this area; it is no longer necessary to make the outer face of the base flared toward its periphery.

In a specific variant, each adhesive strip is based on a mixture of epoxy resin and acrylic resin; since the final adhesion of this type of material requires a supply of heat in conditions very similar to the conditions required for the manufacture of a laminated glazing unit, it is no longer necessary to provide a special polymerization stage: the final adhesion is developed "in parallel", during the manufacture of the laminated glazing unit, where the glazed element is a laminated glazed element.

The outer face of the base takes the form of a ring surrounding the aperture of the base. In a particular variant, said outer face of the base has no peripheral ridge around the aperture; thus the base contains less material, is easier to design and is lighter, and the outer face of the base is more easily adaptable to any defects in the curvature of the inner surface of the glazed element.

In a very particular variant, the adhesive strips have the same dimensions of length l, height h and thickness e, in order to facilitate installation; consequently, there is no need for two separate references in the base fastening workshop for the two strips, and a single reference is sufficient.

On the other hand, it is preferable for each strip to be made in one piece; theoretically, there is no reason why each strip should not be made of a number of parts, but this is less practical.

Preferably, the adhesive strips are positioned substantially parallel to each other on the outer face of the base, in order to facilitate the positioning of the strips before the base is fastened to the glazed element.

Preferably, also, the adhesive strips are positioned horizontally, one on each side of the aperture.

In a variant, at least one adhesive strip has, at each of its two longitudinal ends along the transverse horizontal axis Y-Y', an angled part oriented along the vertical axis Z-Z'.

In a very particular variant, the two adhesive strips each have an angled part of this type at each of their two longitudinal ends along the transverse horizontal axis Y-Y', and the adhesive strips are positioned head to tail.

Preferably, also, the total surface area of the two adhesive strips represents approximately one half ($\pm 1/10^e$) of the surface area of the outer face of the base.

Each adhesive strip may have a surface area in the range from 3 to 9 $cm^2$, and preferably approximately 6 $cm^2$, where the surface area of the outer face of the base is about 24 $cm^2$.

The surface of the outer face of the base is the surface which is physically close to and opposite the inner face of the glazed element (not including the surface area of the aperture of the base for the passage of the accessory). The outer face may be in the general shape of a parallelogram, a rectangle, a square or a lozenge; it may or may not be round, as required. The aperture may be in the center of the outer face of the base with an outer surface having approximately the same width around the whole of the aperture, but this is not essential.

The present invention also relates to a base for fastening an accessory to the glazing unit according to the invention, said base having two adhesive strips, each having an elongate shape.

The present invention also relates to a method for manufacturing a glazing unit according to the invention having a glazed element and at least one base for fastening an accessory, said base being bonded to the inner face of the glazed element by means of two adhesive strips located on the outer face of the base, each of said adhesive strips having an elongate shape and both strips being positioned lengthwise along the transverse horizontal axis Y-Y' of said glazing unit.

Preferably, said glazed element is a laminated glazed element and the fastening of the base is carried out during the operation of laminating and assembling the sheets of the glazed element together.

The present invention also relates to the use of a base for reversibly fastening an accessory to a glazing unit according to the invention, said base being bonded to the inner face of the glazed element by means of two adhesive strips located on the outer face of the base, each of said adhesive strips having an elongate shape and both strips being positioned lengthwise along the transverse horizontal axis Y-Y' of said glazing unit.

The present invention enables a very reliable bond to be created between the glazed element and the accessory or accessories attached to this glazed element.

Thus, for any glazing unit, and from one glazing unit to another in the same series, the fastening of each base is secure and dependable, while also being rapid and less costly.

Even if the material which enables the base to be fastened to the glazed element is more costly, this increase in cost is compensated for by the fact that it is no longer necessary to provide a stage of waiting for the polymerization of the layer that was used previously, and by the reduction in the risk that a glazing unit might become unsuitable for its intended use owing to the incorrect handling of the layer used previously.

An embodiment of the present invention is described below by way of non-limiting example, with reference to the attached drawings, in which.

In these drawings, the proportions between the various elements are retained in each drawing, but the elements in the background are not generally shown, in order to facilitate the consultation of the drawings.

FIGS. 1 and 2 show a vehicle glazing unit 1' according to the prior art, comprising a glazed element 2 and a base 3' according to the prior art.

The glazing unit 1' is intended to fill a window opening, thereby creating a separation between an inner space of the vehicle and a space outside the vehicle. Thus the glazed element 2 has an inner face 21, intended to be directed toward the inner space, an outer face 23, intended to be directed toward the outer space, and a peripheral edge 22.

Thus, when reference is made to the concepts of "inner" and "outer" in the present document, it is always with reference to this assumption.

The glazed element may be monolithic, in other words consisting of a single sheet of material, or composite, in other words consisting of a plurality of sheets of material between which at least one layer of adhering material is inserted in the case of laminated glazing units or glazed elements. The sheet or sheets of material may be mineral, notably glass, or organic, notably made of plastic material.

In the case of a glazing unit for a vehicle, the glazing unit generally has a decorative strip (not shown) on at least part of its edge, around the whole of the inner face 21. This decorative strip is generally formed by a deposit of enamel formed on the inner face of the glazed element if the latter is monolithic, or on an intermediate face of the glazing unit in the case of a composite glazing unit, but it may also be produced by partial and/or peripheral coloring of a sheet of material used, notably a sheet of organic material.

If the glazed element is made of organic material, it is manufactured before the application of the invention, by molding the constituent material of the glazed element in a molding device including a mold having at least a fixed mold part and a movable mold part which is movable relative to the fixed mold part, said mold parts interacting in the closed state of the mold, during the molding stage, to form a mold cavity which in cross section has the cross-sectional shape of the glazed element. Frequently, the glazed element of organic material is not flat, but curved.

If the glazed element is made of mineral material, it is manufactured before the application of the invention by melting mineral material into a flat sheet, and then cutting out this sheet and curving and/or dip-coating the sheet if required.

If the glazed element is a composite glazed element, it is manufactured by the well-known method for manufacturing multiple glazing units or curved laminated glazing units.

In FIG. 2, the glazed element 2 is a curved laminated glazing unit. In this case it is a windshield of a motor vehicle.

Figure 4:
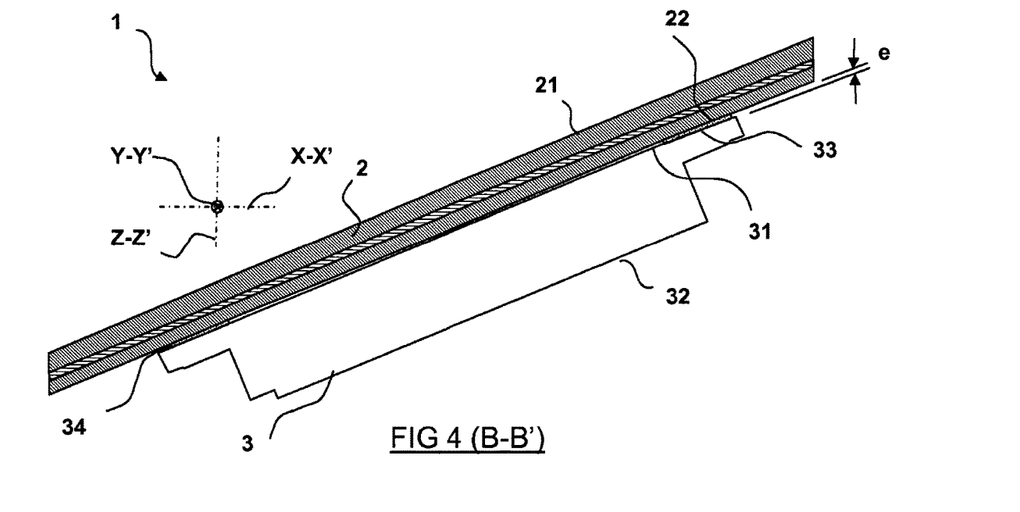
FIG. 4 is a view in partial section taken along the line BB' of FIG. 3, which also partially shows, in cross section, the glazed element and the two adhesive strips.

The present invention relates to a glazing unit 1, notably a vehicle glazing unit such as that shown in FIG. 4.

Figure 3:
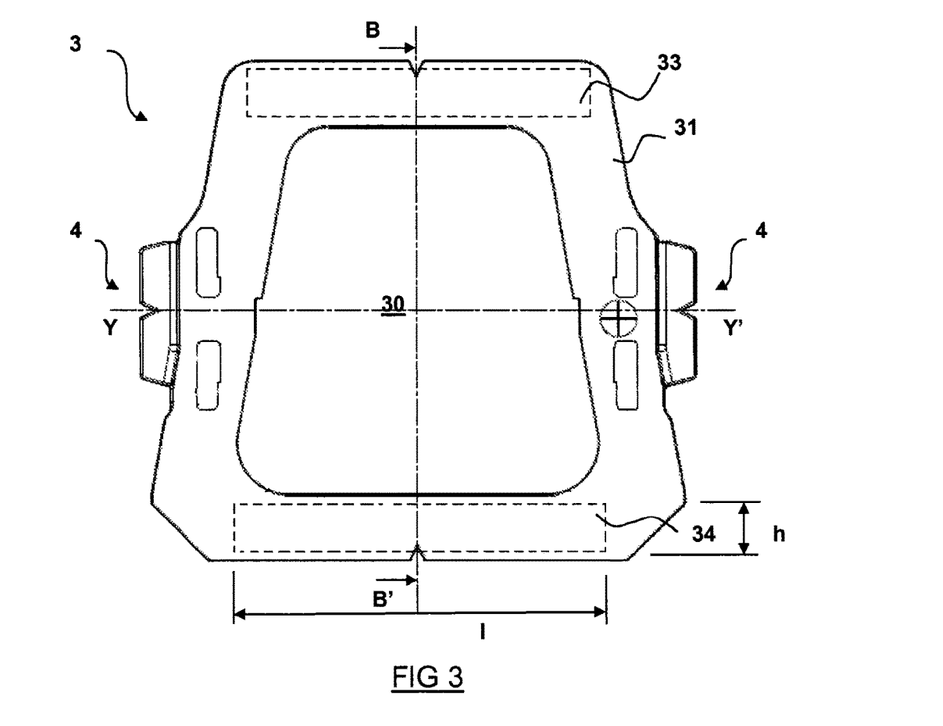
FIG. 3 is a face-on view of a base according to the invention having two adhesive strips.

The glazing unit 1 according to the invention is identical to the glazing unit 1' shown in FIG. 3, except that it has a base 3 according to the invention. The technical elements of the prior art glazing unit 1' which may be used in an identical way for the glazing unit 1 according to the invention are given the same references throughout the present document. In particular, the glazed element 2 may be identical.

As for the glazing units 1', each vehicle glazing unit 1 according to the invention has, as shown in FIG. 4, a glazed element 2 and at least one base 3 for the reversible attachment of an accessory (not shown) to said glazed element 2, said base 3 having an aperture 30 for the passage of said accessory or part of said accessory, said base 3 having a non-flat outer face 31, which is fastened opposite a non-flat inner face 22 of said glazed element 2.

The material of the base is the same; for example, it is a metal alloy which has been anodized.

On the other hand, by contrast with the glazing units 1', the outer face 31 of the base 3 according to the invention does not have a peripheral ridge around the aperture 30.

Additionally, the outer face 31 is not flared in a centrifugal manner, but has the same curvature as said inner face 22 of the glazed element 2 at the location where the base is fastened to the glazed element.

The outer face 31 and the inner face 22 are thus parallel. In cross section, the angle between the outer face 31 of the base and the inner face 22 of the glazed element is therefore always infinite.

Advantageously, if the inner face 22 of the glazed element is slightly curved at the location where the accessory is to be positioned, with a very large radius of curvature (at least two meters) in the vertical and/or horizontal direction, then the outer face 31 of the base is also slightly curved; it is therefore possible for a single base to serve for a plurality of models of glazed element if the location chosen for the positioning of the base is slightly curved for all of these models.

According to the invention, said outer face 31 has two, and only two, adhesive strips 33, 34, each having an elongate shape and both arranged lengthwise along the transverse horizontal axis Y-Y' of said glazing unit.

A comparison of FIG. 4 with FIG. 2 shows that the base 3 according to the invention is not fastened by bonding to the inner face of the glazed element by means of a layer of polyurethane positioned against the whole outer face 31; instead, the base 3 according to the invention is fastened by bonding by means of two adhesive strips 33, 34 only.

However, these two adhesive strips are not placed in a random manner; they are placed lengthwise in the direction of the glazing unit in which there is the smallest variation of dimensions from one glazed element to another in the same series, both of them being placed lengthwise along the transverse horizontal axis Y-Y'.

Thus the invention reduces the risk that an adhesive strip may not be fully in contact with the inner surface of the adjacent glazed element.

In fact, for the application of the invention, it is preferable not to provide an adhesive strip or strips lengthwise along the vertical axis Z-Z' of said glazing unit.

The two adhesive strips are also, preferably, placed in the horizontal direction Y-Y' between the means of attachment which enable said accessory to be attached mechanically in a reversible manner to said base when these means of attachment are placed one on each side of said base, along the transverse horizontal axis Y-Y' of said glazing unit.

Each adhesive strip 33, 34 is, for example, based on a mixture of epoxy resin and acrylic resin. A resin mixture of this type polymerizes at a temperature of about 150° C. within approximately 20 minutes.

Since these two conditions are present during the manufacture of a laminated glazing unit (and more precisely during the stage of laminating or assembling the sheets together), it is possible to position a base according to the invention, provided with two as yet unpolymerized adhesive strips against the inner face of a glazed element before this glazed element is subjected to the stage of lamination (by treatment in a kiln): the two adhesive strips can thus be polymerized during the lamination stage, in parallel with the rest of the process.

Both of the adhesive strips 33, 34 have the same dimensions, namely:

a length l of approximately 6 cm
a height h of approximately 1 cm, and
a thickness e of approximately 0.5 mm.

Each of the two strips is in the form of a rectangle: the height is identical according to the length; the thickness is also constant.

They are positioned parallel to each other and parallel to the upper and lower edges of the base. They are positioned one on each side of the aperture 30, above and below the aperture when viewed in the vertical orientation Z-Z'.

The aperture 30 is in the center of the outer face of the base, with an outer surface having practically the same width around the whole of the aperture.

Thus each adhesive strip has a surface area of about 6 cm$^2$, where the surface area of the outer face 31 of the base is about 24 cm$^2$.

The total surface area of the two adhesive strips 33, 34 represents approximately one half ($\pm/10^e$) of the surface area of the outer face 31 of the base.

The outer face 31 of the base is in the general shape of a parallelogram, a rectangle, a square or a lozenge, which is open in its center, but is not round; the aperture 30 is preferably formed in its center, in such a way that some of the material of the outer face of the base completely surrounds the aperture; however, it is possible for the outer face 31 not to be completely peripheral around the whole of the aperture.

For example, with the invention, it is no longer strictly necessary to provide any of the outer face 31 under the means of attachment 4. In this case, clearly, the ratio between the total surface areas of the two adhesive strips and the surface area of the outer face 31 of the base is reduced as a result.

Fatigue tests have shown that the fastening provided by the adhesive strips 33, 34 is extremely reliable in use, and is more reliable than the prior art solution shown in FIGS. 1 and 2.

In order to make the fastening of the base to the glazed element more reliable, it is possible for at least one adhesive strip to have an angled part at each of its two longitudinal ends along the transverse horizontal axis Y-Y'.

Figure 5:
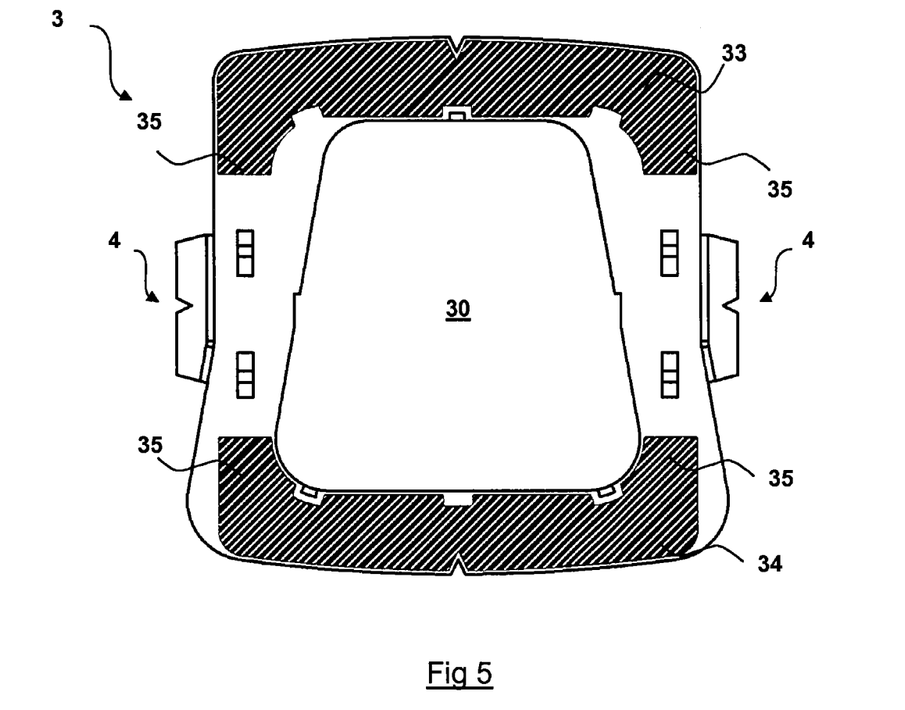
FIG. 5 is a face-on view of a variant embodiment of the base according to the invention having two adhesive strips, each having an angled part at each of its two longitudinal ends along the transverse horizontal axis Y-Y'.

FIG. 5 shows a variant embodiment with an even more reliable fastening.

In this illustrated variant, each of the two adhesive strips 33, 34 has an angled part 35 at its two longitudinal ends according to the transverse horizontal axis Y-Y', the two angled parts of the upper adhesive strip 33 being oriented downwards in the direction of the vertical axis Z-Z', and the two angled parts of the lower adhesive strip 34 being oriented upwards in the direction of the vertical axis Z-Z'.

Thus, the adhesive strips 33, 34 are positioned head to tail with the respective angled parts extending in directions and paths converging along the vertical axis Z-Z'.

To simplify the system of references used for the adhesive strips, it is possible for the shape of the upper adhesive strip 33 to be symmetrical with the shape of the lower adhesive strip 34 with respect to the transverse horizontal axis Y-Y'.

This is the case in FIG. 5: the shape of the upper adhesive strip 33 is symmetrical with the shape of the lower adhesive strip 34 with respect to the transverse horizontal axis Y-Y', because the upper adhesive strip 33 has a length along the transverse horizontal axis Y-Y' identical to the length of the lower adhesive strip 34, and a width along the central axis Z-Z' identical to the width of the lower adhesive strip 34.

Figure 6:
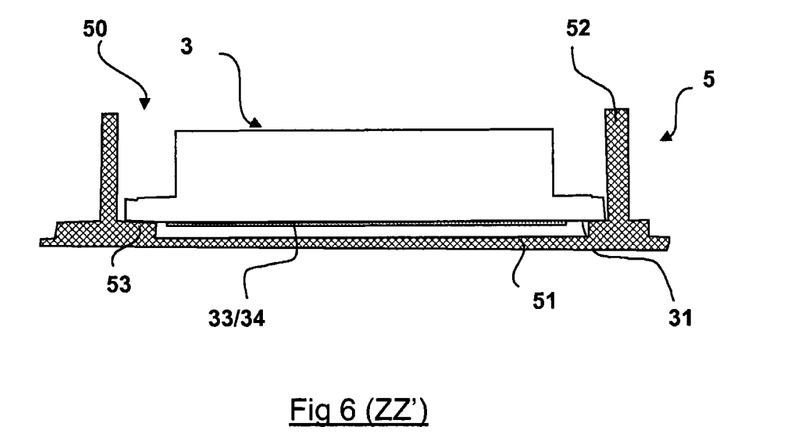
FIG. 6 is a view in partial section of a tray for carrying bases according to the invention.

As shown in FIG. 6, the present invention proposes the use of a shaped tray, of heat-formed plastic material for example, for carrying the bases before they are fastened to the glazed elements.

The bases 3 are thus each positioned in a housing 50 delimited by a bottom 51 and vertical walls 52. The distance between the vertical walls is approximately equal to the overall width and length of the base, to ensure that the bases are retained laterally by the walls while being carried.

The adhesive strips 33, 34 are not in contact with the bottom 51, because a shoulder 53 is provided at the periphery of the base to raise the bases by approximately 1 to 2 mm from the bottom.

In these housings, the lower faces of the adhesive strips 33, 34, that is to say the faces oriented toward the bottom 51, are protected if necessary by a protective film (also called a "liner") which has been positioned before the bases on the bottom of the housings.

In this variant, it is possible to arrange for the bases to be directly in contact with the protective film and for shoulders to be provided to retain the bases vertically on the protective film, particularly during their carriage to the workshop where they are positioned on the glazed elements.

The trays 5 may have, for example, about fifty housings each, and therefore may have the same number of bases; they can be re-used for bases within the same series.

Each tray has a positioning notch used for spatial reference purposes, in order to allow an automated system to pick up each base and then position it on a glazing unit. If the bases are not in contact with a protective film, it is easier to manage the grasping of each base by a robot, since in this case it is unnecessary to specify any particular movement for "unsticking" the base from the protective film: even if the adhesion of the base to the protective film is not very strong, it still has to be overcome and a special movement has to be made to pick up a base without including any part of the protective film.

Figure 7:
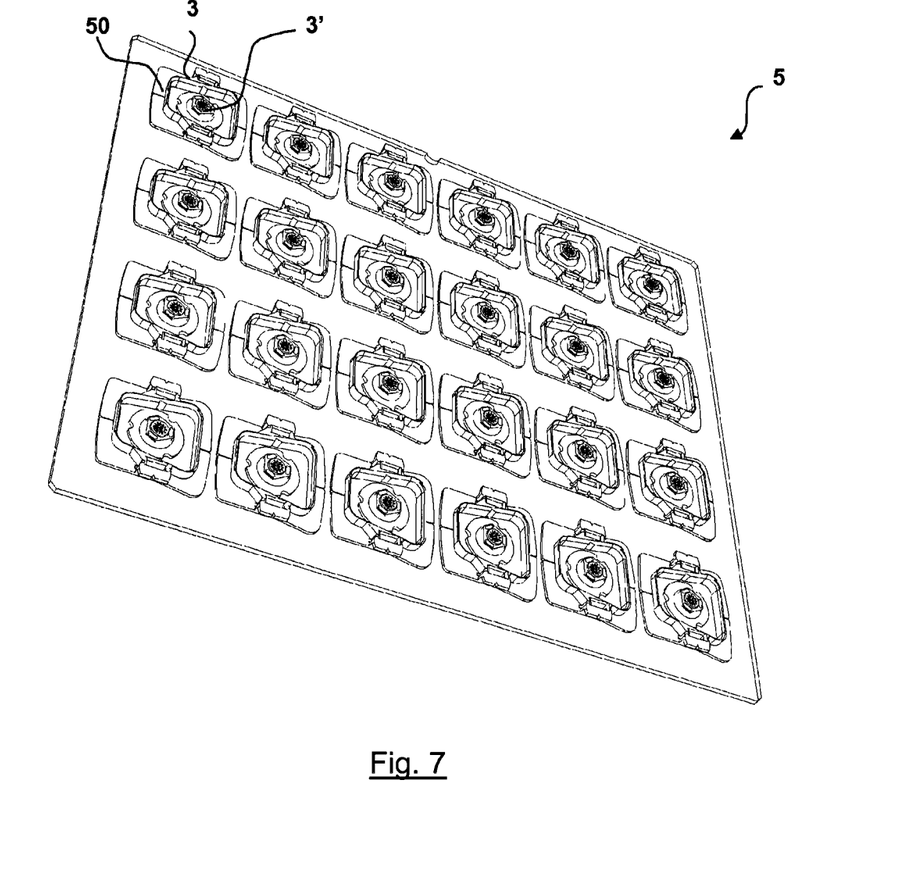
FIG. 7 is a perspective view of a tray with double housings, in each of which two different bases can be placed.

FIG. 7 shows a perspective view of a tray having 24 housings 50, with two different bases in each housing, namely a base 3 for a sensor of the type shown in FIGS. 3 and 4, and, in the aperture of this base, a second, circular, base 3' for an interior rear-view mirror.

This solution saves space in the workshop and facilities procurement.

The invention claimed is:

1. A vehicle glazing unit comprising:
   a glazed element; and
   at least one base for reversible attachment of an accessory to the glazed element;
   the base including an aperture for passage of the accessory, the base including a non-flat outer face which is fastened opposite a non-flat inner face of the glazed element;
   wherein the outer face includes two adhesive strips each having an elongate shape and both positioned such that a longitudinal axis of each of the adhesive strips is positioned lengthwise along a transverse horizontal axis of the glazing unit, and
   wherein the two adhesive strips are positioned respectively adjacent an upper and lower edge of the aperture such that a plane that extends through a center of the aperture and perpendicular to the transverse horizontal axis of the glazing unit also extends through each of the two adhesive strips.

2. The glazing unit as claimed in claim 1, wherein the outer face of the base follows the same curvature as the inner face of the glazed element at a location where the base is fastened to the glazed element.

3. The glazing unit as claimed in claim 1, wherein each adhesive strip is based on a mixture of epoxy resin and acrylic resin.

4. The glazing unit as claimed in claim 1, wherein the outer face has no peripheral ridge around the aperture.

5. The glazing unit as claimed in claim 1, wherein the adhesive strips have the same dimensions in terms of length, height, and thickness.

6. The glazing unit as claimed in claim 1, wherein the adhesive strips are positioned substantially parallel to each other.

7. The glazing unit as claimed in claim 1, wherein at least one adhesive strip includes an angled part at each of its two longitudinal ends along the transverse horizontal axis.

8. The glazing unit as claimed in claim 7, wherein each of the two adhesive strips includes an angled part at each of its two longitudinal ends along the transverse horizontal axis, and the two adhesive strips are positioned head to tail.

9. The glazing unit as claimed in claim 1, wherein the total surface area of the two adhesive strips represents approximately one half of the surface area of the outer face.

10. The glazing unit as claimed in claim 1, wherein the glazed element is a laminated glazed element.

11. A method for manufacturing the glazing unit as claimed in claim 1 including the glazed element and the at least one base for fastening the accessory, the method comprising:
    bonding the base to the inner face of the glazed element by the two adhesive strips located on the outer face of the base, each of the adhesive strips having an elongate shape and both strips being positioned lengthwise along the transverse horizontal axis of the glazing unit.

12. The method for manufacturing a glazing unit as claimed in claim 11, wherein the glazed element is a laminated glazed element and the bonding of the base is carried out during a laminating operation.

13. Use of a base for reversibly fastening the accessory to a glazed element as claimed in claim 1, the base being bonded to the inner face of the glazed element by the two adhesive strips located on the outer face of the base, each of adhesive strips having an elongate shape and both strips being positioned lengthwise along the transverse horizontal axis of the glazing unit.

14. A base for fastening an accessory to a vehicle glazing unit, the base comprising:
    two adhesive strips, each having an elongate shape,
    wherein the vehicle glazing unit includes a glazed element and the base for reversible attachment of the accessory to the glazed element,
    wherein the base includes an aperture for passage of the accessory, the base including a non-flat outer face which is fastened opposite a non-flat inner face of the glazed element,
    wherein the outer face includes the two adhesive strips, and both of the adhesive strips are positioned such that a longitudinal axis of each of the adhesive strips is positioned lengthwise along a transverse horizontal axis of the glazing unit,
    wherein the two adhesive strips are positioned respectively adjacent an upper and lower edge of the aperture such that a plane that extends through a center of the aperture and perpendicular to the transverse horizontal axis of the glazing unit also extends through each of the two adhesive strips.

\* \* \* \* \*